(12) United States Patent  
Scotson et al.

(10) Patent No.: US 9,873,451 B2  
(45) Date of Patent: Jan. 23, 2018

(54) MOTOR CIRCUIT FOR ELECTRIC POWER ASSISTED STEERING AND METHOD

(71) Applicant: TRW Limited, Solihull, West Midlands (GB)

(72) Inventors: Peter Geoffrey Scotson, Worcester (GB); Hui Jiang, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 4 days.

(21) Appl. No.: 15/031,814

(22) PCT Filed: Oct. 23, 2014

(86) PCT No.: PCT/GB2014/053170  
§ 371 (c)(1),  
(2) Date: Apr. 25, 2016

(87) PCT Pub. No.: WO2015/059486  
PCT Pub. Date: Apr. 30, 2015

(65) Prior Publication Data  
US 2016/0244089 A1 Aug. 25, 2016

(30) Foreign Application Priority Data  
Oct. 25, 2013 (GB) .................................. 1318910.5

(51) Int. Cl.  
*H02H 7/08* (2006.01)  
*B62D 5/04* (2006.01)  
(Continued)

(52) U.S. Cl.  
CPC ......... *B62D 5/0484* (2013.01); *B62D 5/0463* (2013.01); *B62D 5/0487* (2013.01);  
(Continued)

(58) Field of Classification Search  
CPC .. B62D 5/0484; B62D 5/0481; B62D 5/0487; H02P 1/46; H02P 29/024  
(Continued)

(56) References Cited

U.S. PATENT DOCUMENTS 4,896,089 A 1/1990 Kliman et al.  
6,424,107 B1* 7/2002 Lu ............................. H02P 6/10  
318/432

(Continued)

FOREIGN PATENT DOCUMENTS

EP 2015445 A2 1/2009  
EP 2080687 A2 7/2009  
WO 2006005927 A2 1/2006

OTHER PUBLICATIONS

Patents Act 1977: Search Report under Section 17, Application No. GB1318910.5 dated Mar. 17, 2014.  
(Continued)

*Primary Examiner* — David S Luo  
(74) *Attorney, Agent, or Firm* — MacMillan, Sobanski & Todd, LLC

(57) ABSTRACT

A method of operating an electric motor of an electric power assisted steering system comprising performing the following steps when the motor is in a defined fault mode: A) monitoring the position of the motor rotor, B) identifying the presence of a condition in which the rotor is within a predefined angular range of a known angular position, the rotor moving towards that position by turning of the steering wheel, and a torque is demanded from the motor which tends to move the rotor closer to that angular position as the wheel continues to move in the identified direction of movement; C) if the condition is identified varying currents applied to the motor to cause the rotor to move away from the known angular position; and D) subsequently varying the torque  
(Continued)

demanded from the motor to cause the rotor to move back in a direction towards the known angular position.

12 Claims, 6 Drawing Sheets

(51) Int. Cl.
    *H02P 29/024* (2016.01)
    *H02P 29/028* (2016.01)
    *H02P 29/032* (2016.01)

(52) U.S. Cl.
    CPC ........ *H02P 29/028* (2013.01); *H02P 29/0241* (2016.02); *H02P 29/032* (2016.02)

(58) Field of Classification Search
    USPC ............................ 180/443; 318/461, 445, 34
    See application file for complete search history.

(56) References Cited

U.S. PATENT DOCUMENTS

| | | | |
|---|---|---|---|
| 8,106,613 B2 * | 1/2012 | McLean .................. | H02M 7/48 318/400.26 |
| 2007/0296372 A1 | 12/2007 | Hori et al. | |

OTHER PUBLICATIONS

PCT International Search Report and the Written Opinion, Application No. PCT/GB2014/053170 filed Oct. 23, 2014, dated Jan. 21, 2015.

* cited by examiner

MOTOR CIRCUIT FOR ELECTRIC POWER ASSISTED STEERING AND METHOD

CROSS-REFERENCE TO RELATED APPLICATIONS

This application is a national stage of International Application No. PCT/GB2014/053170, filed Oct. 23, 2014, the disclosures of which are incorporated herein by reference in entirety, and which claimed priority to Great Britain Patent Application No. 1318910.5, filed Oct. 25, 2013, the disclosures of which are incorporated herein by reference in entirety.

BACKGROUND OF THE INVENTION

This invention relates to improvements in motor circuits for use in electric power assisted steering systems, and in particular to a method for controlling the motor during a known fault mode in which the motor may be unable to produce an output torque at certain rotor conditions.

It is known to provide a motor in an electric power assisted steering system which is configured in such a way that a torque output from the motor will help the driver of the vehicle to turn the steering wheel. The motor is typically connected to a steering column or rack through a gearbox, and a controller demands a torque from the motor which has a value that is a function of the torque applied to the steering wheel by a driver. The demanded torque is converted into drive currents that are applied to the motor.

Motor drive circuits for such motors using feedback control and PWM are well known in the art. For example, WO2006005927, discloses a typical system and the teaching of that document is incorporated herein by reference.

During steady state operation of the motor, where the controller is demanding a constant torque and rotating at a constant speed, the voltages applied to each of the phases of a three phase motor may be chosen so that the current in each phase varies sinusoidally over an electrical revolution of the motor rotor, the frequency of the signal being chosen according to the speed of rotation of the rotor of the motor, and the magnitude of the signals being dependent on the required torque. By arranging for each of the current waveforms to be offset from the others by 120 degrees the overall current carried by the motor will be constant and so the motor torque will also be constant as the motor rotates. Applying currents in this pattern ensures that the motor rotates smoothly with no peaks in torque. This is well known in the art and the theory behind this will therefore not be described in detail here.

Most motors used in electric steering systems are three phase, as described above. It is also known to provide a fault mode of operation for the motor to allow the motor to continue providing some assistance torque in the event that one of the phases of the motor fails in an open circuit leaving only two phases able to conduct current. The controller may continue as in the normal mode of operation by applying the sinusoidal waveforms that would be used if all three phases are working. The torque of the motor will vary as the motor rotates. However there will be two points which are referred to here as zero torque points where the rotor is perfectly aligned with the magnetic field and so cannot generate any torque. When the motor is used in an electric power steering, these points of zero torque will be felt through the steering wheel as a torque ripple which may worry a driver.

In many instances, although annoying to the driver, the presence of the zero torque points do not significantly impair the ability of the driver to turn the wheel. However, if the steering wheel is being turned at low speeds with a high demanded torque, the disappearance of the torque at the zero point will produce a very significant steering feel anomaly and in certain cases could leave the driver unable to turn the steering wheel. This gives the driver the feeling of the steering being pushed into a "notch" which the driver can find hard to push past.

BRIEF SUMMARY OF THE INVENTION

A feature of the present invention is to provide a motor control method for a motor of an electric power steering system that has a known fault mode with a zero torque position that improves the perceived feel of the steering during the fault mode by at least partially ameliorating the impact of the zero torque position.

According to a first aspect the invention provides a method of operating a motor of an electric power assisted steering system of the kind which includes a multi-phase motor that is operatively connected to a part of the steering gear that rotates with the steering wheel so as to apply an assistance torque that during normal operation assists the driver in turning the steering wheel, the assistance torque generated by the motor being controlled by a motor torque demand circuit that outputs a motor torque demand signal to a motor controller, the motor having a defined fault mode in which the motor is incapable of generating an output torque when the rotor is located in at least one angular position regardless of the motor torque demand output by the motor controller, the method comprising performing the following steps when the motor is known to be in the defined fault mode:

A) monitoring the position of the rotor,
B) identifying the presence of a condition in which the rotor is within a predefined angular range of the at least one known angular position, the rotor is moving towards that position due to the driver turning the steering wheel, and a torque is demanded from the motor which would tend to move the rotor closer to that angular position as the wheel continues to move in the identified direction of movement;
C) in the event that the condition is identified varying the currents applied to the motor to cause the motor rotor to move away from the known angular position; and
D) subsequently demanding a torque from the motor to cause the motor rotor to move back in a direction towards the known angular position.

The invention therefore identifies when the rotor is moving towards the known angular position at which it may be unable to apply an assistance torque, the "zero torque position" and if it determines that the motor may become stuck at that point, the motor is "reversed back" a distance by altering the torque demand and then torque switched back to help the rotor move forward past the zero point. By taking a step back the motor will swiftly move forward due to the effect of the steering still turning and the motor winding up the compliance in such as way that it move through the zero point.

The step B) of identifying the condition in which the rotor is likely to become stuck may include monitoring other parameters of the motor. For instance, it may comprise monitoring the demanded torque and only identifying the condition if the torque is above a threshold. Alternatively, it may include monitoring the speed of the motor and only identifying the condition if the speed is below a threshold. This may be used alongside, or as well as, the monitoring of the torque.

The step C) may comprise causing the motor to move back by a distance equal to, or less than, the angular movement of the rotor that is required to take up compliance in the gearbox and as such would not cause a significant corresponding movement of the steering wheel. The reverse-forward motion of the motor rotor may still be felt at the steering wheel, perhaps as a gentle vibration, but there would be no significant reverse movement of the steering wheel, as the steering column and wheel have a relatively high amount of inertia.

Thus the invention allows the motor to move back by an amount due to the compliance, which will not create any requirement for the steering wheel to have to move in the reverse direction due to the motor movement. As such this reverse movement of the rotor will not cause any reversal or other change in the steering wheel rotation. Indeed, it is possible for the driver to simply carry on moving the steering in the same direction, the motor reversing and then moving forward to catch up with the steering.

Allowing the gearbox compliance to push the motor back, before the motor is then torqued up again and moved to overcome the compliance, allows for faster movement of the rotor towards the zero as it tries to catch up with the steering, and it is this which can help ensure the motor does not settle at the zero position.

It is known that almost all gearboxes in electric power steering systems include some compliance. As such, the method can be implemented on virtually all electric power steering systems that include a gearbox. Sources of compliance may include—the motor and gearbox shafts, the teeth of the gear wheels, the gear wheels and their mountings.

The method may comprise monitoring the rotor position after steps C) and D), and in the event the motor has not passed the zero position repeating steps C) and D). The method may repeat the steps C) and D) until the motor has passed the zero position.

This monitoring could comprise a step of repeating steps A) and B) after step C), to see if the rotor is moving slowly towards the zero position.

The method may comprise varying the currents to reduce the torque demanded to zero when applying step C) and allowing the rotor to move away from the zero position solely under the returning force of the gearbox compliance. The motor and gearbox will, under no motor torque, unwind by themselves to remove the returning force.

The method may alternatively comprise in step C) varying the currents to demand form the motor a torque that is of the same sign as the original torque demand signal but lower magnitude, as long as it is low enough to be overcome by the unwinding compliance.

In a further alternative, in step C) the currents may be varied to provide the effect of a motor torque demand signal of opposite sign to the original torque demand on entry to the event could be used. This would tend to actively and rapidly move the motor rotor away from the zero torque position. In this case, this will ensure the compliance is removed faster than merely allowing it to unwind naturally.

In a modification, the magnitude of the torque demand may be chosen to vary in proportion to the distance between the rotor position and the zero torque position, increasing as the distance increases. This avoids demanding current at the zero position, where it can have no effect, and, in combination with the chosen conditions in step B, provide a torque demand in proportion to the likelihood of sticking, e.g. if there is still some distance from the zero position when a high torque condition is met, then more drastic action may be needed than if the condition is met later.

The method may comprise reducing the torque demand in step C for a predetermined time or until the motor rotor has moved away from the zero torque position by a predetermined angular amount.

It is preferred that the motor is reversed out and then moved forward again as quickly as possible. This ensures that, where a number of attempts are needed before the motor passes the zero crossing point, it does not take too long.

In each case, it is preferred that the time spent in step C) is less than 10 ms seconds, and that the move to step D) happens immediately after or within 10 ms of the end of step C). This gives a "loop time" of 20 ms or less, equivalent to 50 Hz. which ensures it is fast enough not to move the handwheel and is perceived by the driver as only a vibration.

One of the conditions for identifying the event that triggers steps C) and D) may comprise the rotor being within a predetermined range of angular positions of the zero. This range may vary according to the demanded torque.

The range may be smaller at low torques and greater at high torques.

For instance, a range of 5 to 15 degrees from zero position may be used as an entry condition.

The method may comprise in step D) restoring the demanded torque to the original value demanded by the controller, i.e. the value immediately prior to the event being identified.

In a modification, the torque demand signal value may be restored in step C) to a higher value than the original demanded torque.

The method may comprise, upon identifying that the motor has moved past the zero following the identified zero torque event, reducing the demanded torque below that which was demanded on entry to the event until the motor has moved past the zero position by a predetermined amount or until a predefined time has elapsed. This ensures that the rotor does not shoot past the zero position too quickly, and apply too much assistance.

The motor torque could be reduced by disabling the motor controller, or modifying the torque demand signal fed to the controller.

In an alternative, the method may comprise a step of increasing the motor torque demand after the motor has moved past the zero position so as to allow the motor rotor to "catch up" with the steering wheel movement. This may be for a limited time until it is determined that the motor has caught up to compensate for the reverse/forward movement. Whether or not this is needed will depend on how the motor moved past the zero position.

The step of varying the torque demand may comprise modifying the torque demand on entry to the event by passing it through a filter. Alternatively, it may comprise calculating a new torque demand value independent of the original torque demand value and using that in place of the original.

A hysteresis term, based on the position from the zero-torque position, could be added so that the vibration controller would not be disabled until the motor was further from the notch than when the controller was enabled. This ensures that the steering wheel will not balance on the edge between the normal demand and the substituted demand of motor torque, but must move physically from one state to the other.

Where the method includes generating a motor torque demand signal that has a value indicative of the torque demanded from the motor, the step of varying the demanded torque may comprise modifying the value of that signal. In some cases, the torque demand signal may be used to generate a current demand signal, or signals, in the dq reference frame. In this instance, the step of varying the demanded torque may comprise modifying the values of the current demand signals. This will directly result in a change in the torque produced by the motor, and therefore has the same effect as modifying the torque demand signal. The latter may be preferred as it may be a more convenient place within the motor circuit to intercept and modify the signals, as the torque demand signal is typically produced by a different part of the circuit to the current demand signal.

According to a second aspect the invention provides a motor circuit for use in an electric power assisted steering system of the kind in which a measurement of torque carried by a part of the steering system is used by the motor circuit to produce a torque demand signal indicative of a torque to be applied to the steering system by a motor, the motor circuit comprising:
  a switching circuit comprising a plurality of electrical switches,
  a motor controller that receives a motor torque demand signal and produces control signals for a motor drive circuit that in turn drives the switches of the switching circuit;
  whereby under certain fault mode conditions of the motor the motor is incapable of generating an output torque when the rotor is located in at least one known angular position, in which the circuit further includes:
  means for identifying the presence of a condition in which the rotor is within a predefined angular range of the at least one known angular position, the rotor is moving towards that position due to the driver turning the steering wheel, and a torque is demanded from the motor which would tend to move the rotor closer to that angular position as the wheel continues to move in the identified direction of movement; and
  torque demand varying means arranged in use to vary the torque demanded from the motor to cause the motor rotor to move away from the known angular position, and further arranged in use to subsequently vary the torque demanded from the motor to cause the motor rotor to move back in a direction towards the known angular position.

The applicant has appreciated that when a three phase star point connected motor is operated with one open phase the two remaining un-faulted phases can still be used to drive the motor but there will be two points at which the motor cannot apply torque.

The circuit may include fault detection means for detecting the presence of the fault condition in which the motor is unable to generate torque at certain rotor conditions. This may include means for determining the location of the point or points at which zero torque can be produced.

The means for determining the location may include means for identifying which of a plurality of motor phases has failed as an open circuit.

The motor circuit may include means for continuing to operate the motor in that fault condition, and the means for identifying the possible zero torque fault may only be operable when the motor is operating in the fault condition. Thus, in normal use the torque demanded from the motor will not be modified as there is no zero torque point present, and so the rotor cannot be close to such as point.

The motor may comprise a three phase motor.

The motor controller may be adapted to control the motor using a pulse width modulation (PWM) control strategy.

The torque demand varying means of the second aspect include circuitry and processing logic that may be arranged in use to implement any of the method steps of the first aspect of the invention.

According to a third aspect the invention provides an electric power assisted steering system comprising a steering mechanism that connects a steering wheel to a road wheel, a torque sensor that produces a torque signal indicative of the torque carried by a part of the steering mechanism, and an electric motor circuit according to the second aspect of the invention that includes a motor that is connected to the steering mechanism so that torque produced by the motor is transferred to the steering mechanism, and a means for generating a torque demand signal indicative of a torque to be applied to the steering system by the motor that is a function of the torque measured by the torque sensor The motor may comprise a three phase brushless DC motor.

Other advantages of this invention will become apparent to those skilled in the art from the following detailed description of the preferred embodiments, when read in light of the accompanying drawings.

DETAILED DESCRIPTION OF THE INVENTION

Figure 2:
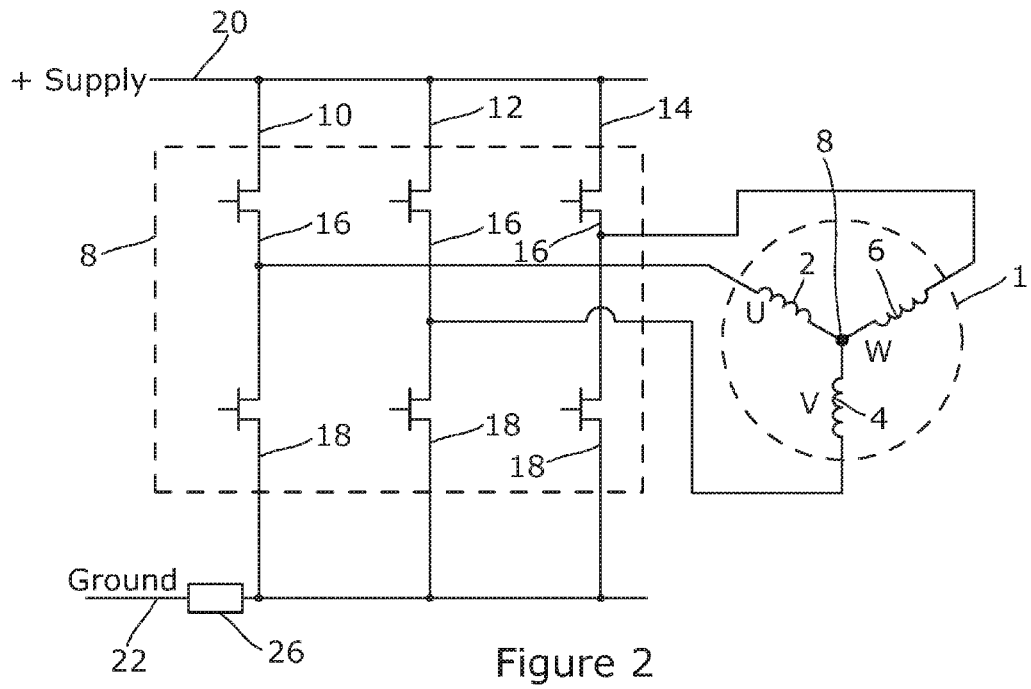
FIG. 2 is a diagram showing the electrical layout of a typical three phase electric motor and a drive circuit which can be used to drive the motor shown in FIG. 11

Referring to FIG. 2 a three phase brushless motor 1 comprises three motor windings 2, 4, 6, generally designated as phases U, V and W. The phases are connected in a star network so that one end of each phase is connected to a corresponding end of each of the other phases at the star point 8. The free ends of each phase are connected to a switching circuit.

The switching circuit comprises a three phase bridge, one for each phase of the motor. Each arm 10, 12, 14 of the bridge comprises a pair of switches in the form of a top switch (transistor 16) and a bottom switch (transistor 18) connected in series between a DC voltage supply rail 20 and a ground line 22. The motor windings 2, 4, 6 are each tapped off from between a respective complementary pair of transistors 16, 18. The switches can be open (OFF) or closed (ON).

Figure 3:
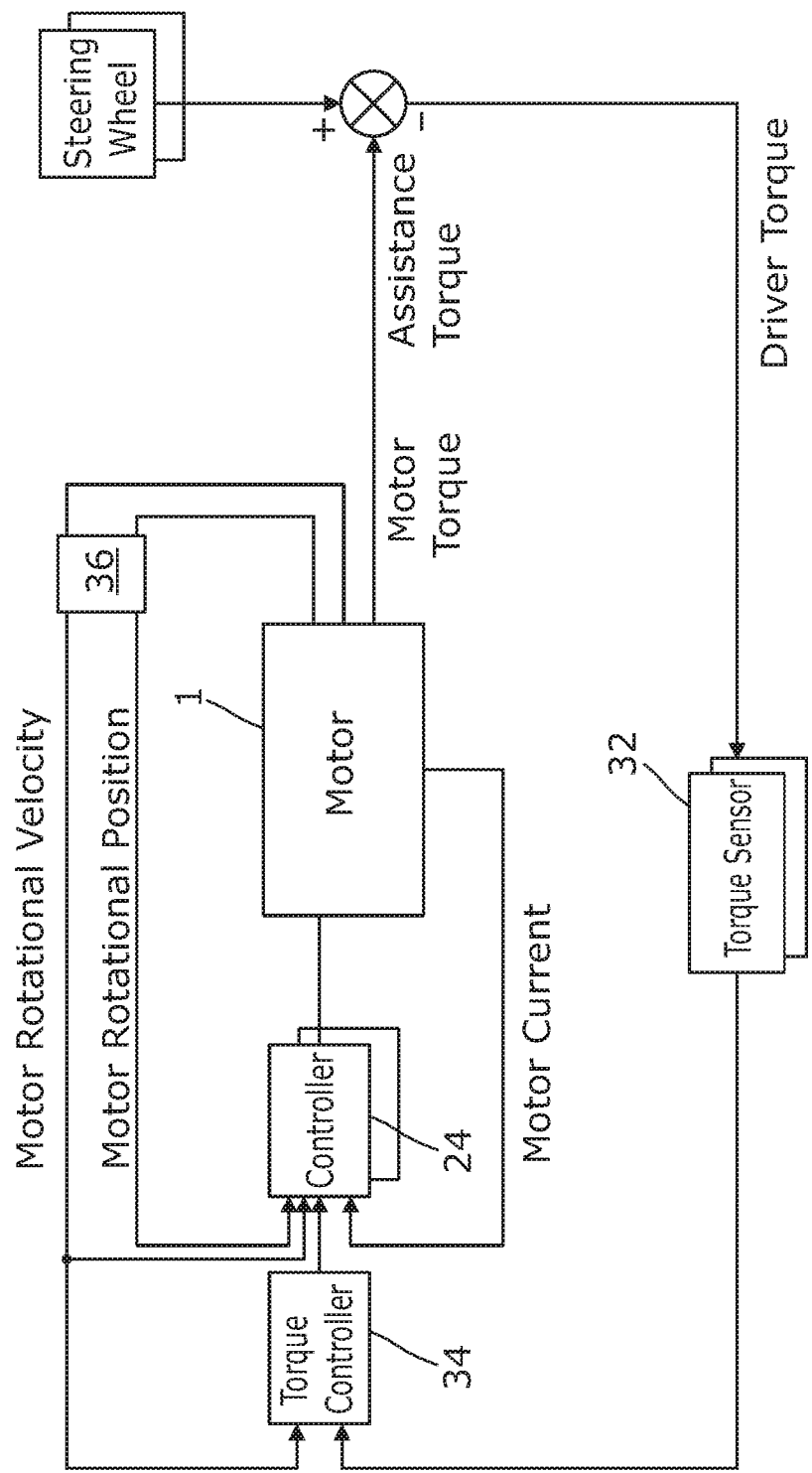
FIG. 3 is a block diagram showing a motor circuit for an electric motor of the electric power steering system of FIG. 1.

The transistors 16, 18 are turned on and off in a controlled manner by a motor circuit including a motor controller 24, which is shown in detail in FIG. 3 of the drawings, to provide pulse width modulation of the potential voltages applied to each of the phase windings, thereby to control the potential difference applied across each of the windings 2, 4, 6 and hence also the current flowing through the windings. This in turn controls the strength and orientation of the magnetic field produced by the windings, which sets the torque produced by the motor.

A current measuring device in the form of a resistor 26 is provided in the ground line 22 between the motor 1 and ground so that the controller 24 can measure the total current flowing through all of the windings 2, 4, 6. In order to measure the current in each of the windings the total current has to be sampled at precise instances within the PWM period where the voltage applied to each terminal of the winding (and hence the conduction state of a particular phase) is known. If preferred a separate current sensor could be provided for each phase.

The controller in this example uses a Space Vector Modulation (SVM) algorithm although any modulation technique can equally be used within the scope of the present invention and this should not be construed as limiting.

Each winding 2, 4, 6 in a three phase system can only be connected to either the supply rail 20 or the ground line 22 and there are therefore eight possible states of the switches of the control circuit. Using 1 to represent one of the phases being at positive voltage and 0 to represent a phase connected to ground, state 1 can be represented as [100] indicating phase U at 1, phase V at 0 and phase W at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

During normal operation when the switching circuit is being controlled by the controller 24 to produce pulse width modulation, each of the phases 2,4,6 will normally be turned on and off once in each PWM period. The relative lengths of time that are taken up in each state will determine the magnitude and direction of the magnetic field produced in each winding, and hence the magnitude and direction of the total torque applied to the rotor. By applying a sinusoidal current waveform to each phase, the motor will produce a constant torque output. Varying the amplitude and sign of the currents in each phase allows the torque to be varied over a wide range of values. Many different motor control strategies are known which can be used to drive the motor, and as they are familiar to the person skilled in the art they will not described in any detail here.

Figure 1:
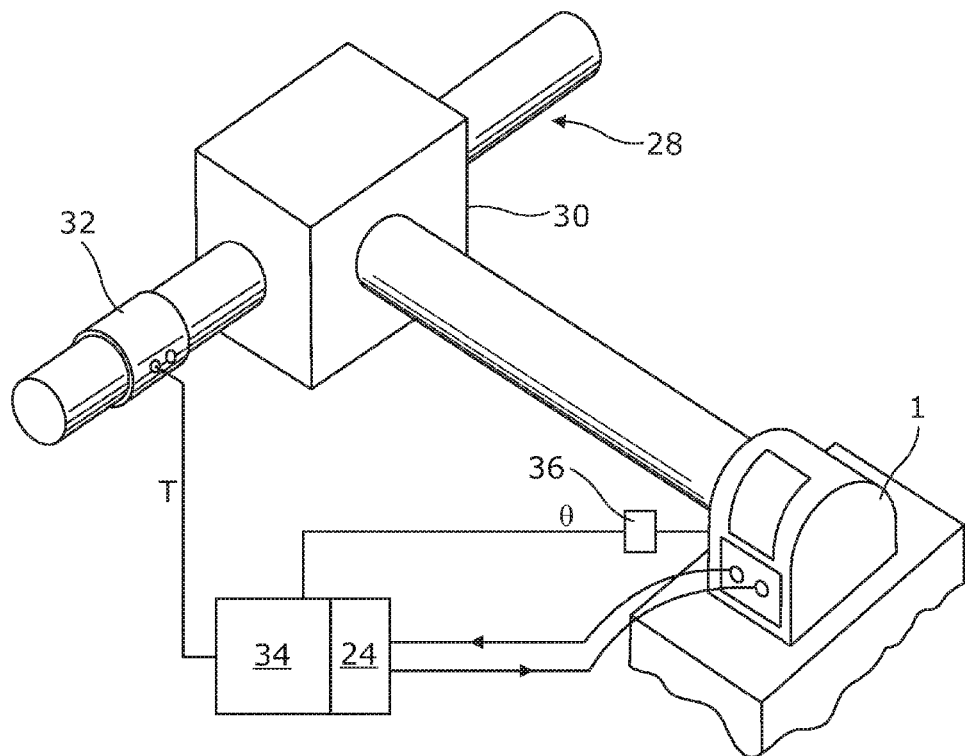
FIG. 1 is a diagram showing the component parts of an embodiment of an electric power assisted steering system that falls within the scope of an aspect of the present invention.

The motor circuit of FIG. 2 can be used in many applications, and in this embodiment forms part of an electric power steering system as shown in FIG. 1. The output shaft of the motor 1 is connected to the steering column 28 or steering rack (or any other moving part of the steering) through a gearbox. This allows the motor to produce an assistance torque that is applied to the moving part of the steering through the gearbox. The gearbox will include an amount of compliance as is well known. This means that as the motor torque increases from zero the gearbox will deform a little as it is placed under load until the compliance is fully taken up. Until it is taken up, the motor can turn with little or no corresponding movement of the steering part. After that, any movement of the motor will be transferred directly to the moving part of the steering.

As shown in FIG. 3, the steering system includes a torque sensor 32 that measures the torque in the steering column, and feeds this to a torque controller 34. The torque controller 34 generates a torque demand signal that is indicative of the amount of torque that the motor is to produce to help the driver turn the steering wheel. The value of the assistance torque demand signal is set as a function of the torque applied to the steering system by the driver, hence the need to input the measured torque to the controller. This torque demand signal is fed to the motor controller which produces the currents for each motor phase that are needed to deliver the demanded torque.

The motor 1 will therefore generally generate an assistance torque that is of the same sign as the torque applied by the driver so that the motor helps to turn the steering wheel in the same direction as the driver is turning the steering wheel. This is also true when the steering is loaded statically with the driver holding the wheel steady during cornering. The torque applied by the driver is assisted by a torque applied by the motor to help hold the wheel against the cornering forces.

The relationship between the driver applied torque and motor applied assistance torque can be tuned from one application to the next, as required by the vehicle manufacturer, by tuning the torque controller. The general aim is for the motor to help the driver to turn the wheel. In doing so, its operation should be as transparent as possible with no sudden changes that the driver would not expect.

The torque demand signal from the torque controller is fed into the current controller 24, which converts the torque demand into a current demand according to known characteristics of the motor 1. The current demand signal is set as a d-q axis current value, which comprises a vector in a frame of reference that is fixed relative to the motor rotor. A motor rotor position sensor 36 is provided which gives the rotor position information, although it is possible that a position sensorless control strategy could be used to drive the motor in which case the position sensor could be omitted. The current demand and torque demand are equivalent in that for a given motor position there is a direct correlation between torque demand and current demand. The values of the current demand signal will obviously be dependent on the motor characteristics, as the torque output from a motor for a given current will be unique to that motor.

Figure 4:
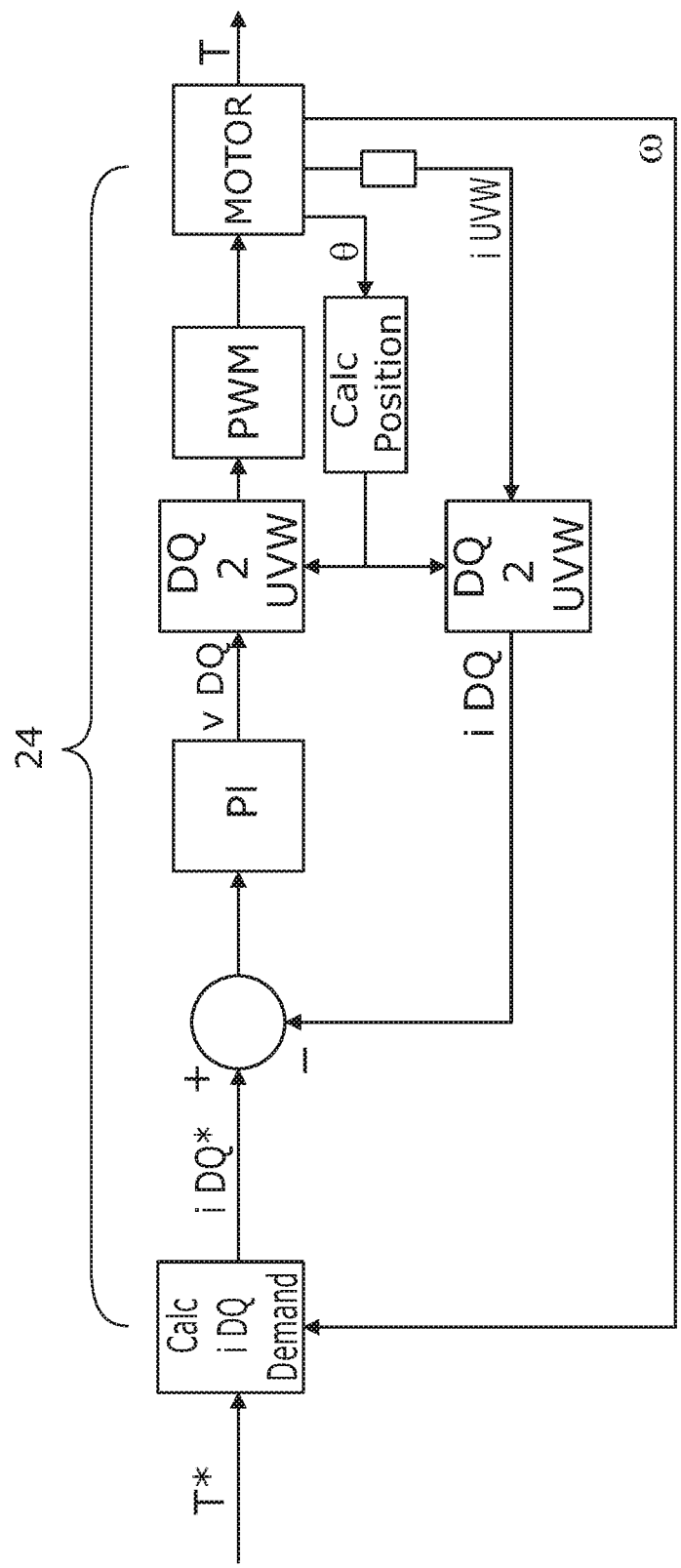
FIG. 4 is a more detailed block diagram showing the elements of a standard closed loop motor controller of the kind that could be used in the system of FIG. 1.

The motor controller 24 compares the current demand signal with the actual currents flowing in the motor, also in the dq frame of reference, to produce an error signal. The current controller 24 then produces voltages to be applied to each phase that will drive the error to a minimum, thereby ensuring that the actual current matches the demanded current. This is shown in FIG. 4 for one possible motor controller configuration.

The motor controller 24 implements three drive modes for the motor. The first is a so-called normal mode, used when all three phases of the motor are correctly conducting.

The second is a so called open phase fault mode where one phase of the motor has failed as an open circuit and cannot conduct current. The other two phases in this mode will still be able to carry current.

The third is a so called zero torque mode which is used only when the motor is already operating in the second mode, or any other fault mode in which there is a zero torque point present during the motor revolution as will be explained below, and when certain predefined conditions are satisfied.

During operation in the normal mode, the motor 1 can apply a given assistance torque for any angular position of the rotor.

Figure 6:
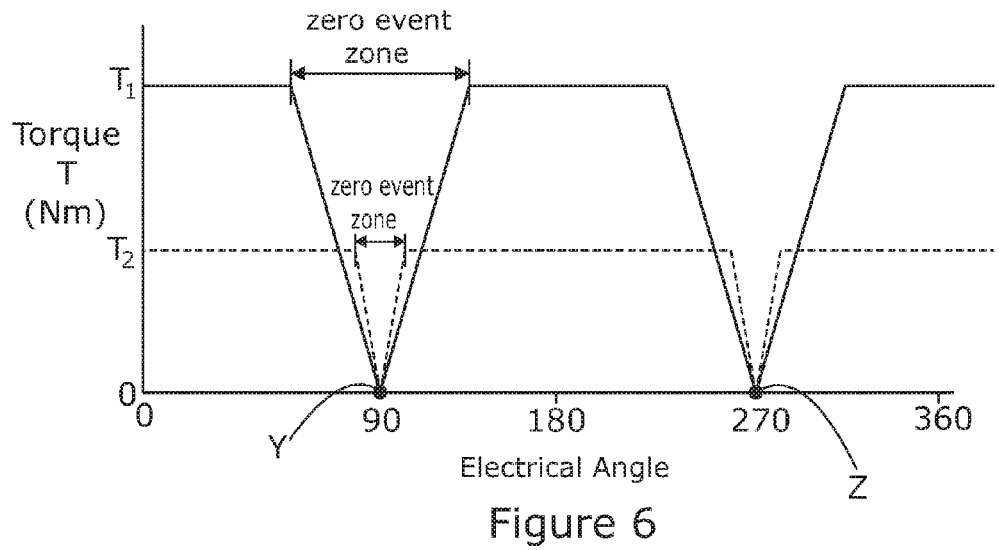
FIG. 6 is a plot of motor assistance torque against time for a high demanded torque (the solid line) and a lower demanded torque (the dashed line) for a motor operating with one phase failed as an open circuit.

If one phase fails open circuit, leaving only two working phases able to carry torque, the motor controller will continue to drive the motor in the second mode of operation. There will be two positions of the rotor in which the motor will not produce any output torque regardless of the torque that is demanded and regardless of how much current flows in the two phases. This is shown in FIG. 6. There are in fact two such positions Y and Z, referred to herein as zero torque positions, each spaced apart by 180 degrees from the other. Either side of the zero position the demanded torque that can be produced drops offs steeply due to limits on the amount of current that can be applied to each phase. The width of the "notch" shown in FIG. 6 across which the torque drops will vary with the demanded torque, being wider at high torques (shown by the solid line) and narrower at low demanded torques (shown by the dashed line). Typically the width of the notch will be between 8 and 15 degrees either side of the zero torque position. When the rotor is in this notch, the output of the motor will not match the torque demanded from the controller and when at the zero position no torque could be produced.

The reduction in assistance torque applied by the motor 1 when close to the zero torque position can be felt by the driver as a torque ripple as the wheel is turned steadily at a constant driver applied torque, the driver perceiving a drop in assistance torque as the steering wheel moves the motor through a zero torque point.

At high steering wheel speeds and high torques, the ripple is felt but does not present a problem for the driver as the momentum in the steering is sufficient to carry the motor past the zero position. However, if the driver is moving the wheel slowly under high torque, perhaps during a tight high speed cornering manoeuvre, and the motor is close to and moving towards the zero position, the lack of torque from the motor could lead to the driver being unable to summon the strength to turn the wheel past the zero position. This can give the feeling that the steering has become stuck.

The motor controller 24, when operating in the second mode, therefore continues to apply currents to the two working motor phases to enable the motor to continue to rotate.

Figure 5:
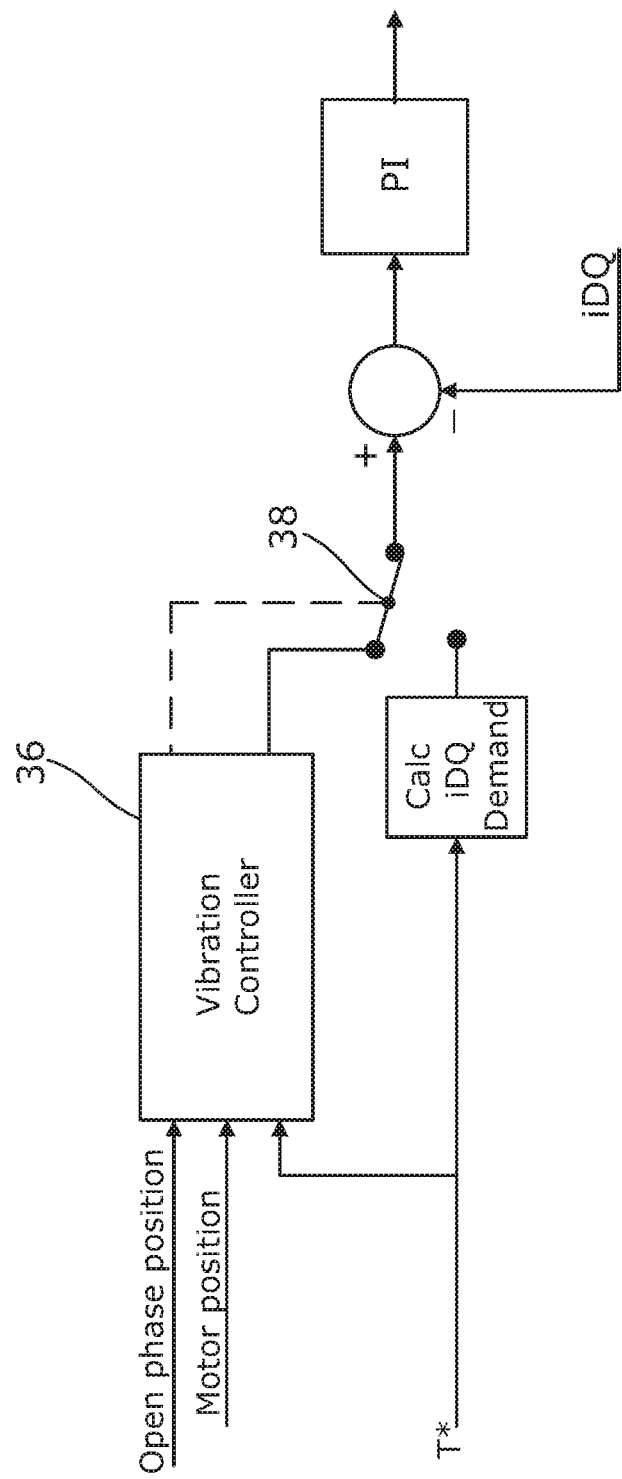
FIG. 5 is a block diagram showing a modification to the controller of FIG. 5 that enables the controller to minimise the risk of the motor becoming stuck at a zero torque position.

To minimise the perception of the steering wheel becoming stuck during such a low speed turn of the steering wheel, the motor controller 24 of this embodiment is arranged to also operate in the third mode where it will vary the torque demand applied to the motor to help the motor pass smoothly (or at least help it to pass) through the zero torque position and to help prevent the motor settling at the zero position where it cannot be powered back out through the application of motor current. The circuit that is used to achieve this may be configured as shown in FIG. 5. This comprises a discrete processing block 36, called a vibration controller, which enables the torque demand signal (or in this case the current demand signal expressed in the dq frame) that is input to the motor controller 24 to be switched between the normal mode torque (or current) demand signal and a substitute signal. A switch 38 is provided that allows the input to move from one to the other.

The discrete processing block 36 is constantly active when the motor is operating in the fault condition, monitoring the motor rotor position and the position of the zero torque point. The processing block therefore either a) allows the torque demand to be applied unmodified to the motor or b) modifies the torque demanded from the motor following a defined control strategy until such time as the motor has passed the zero position.

Figure 9:
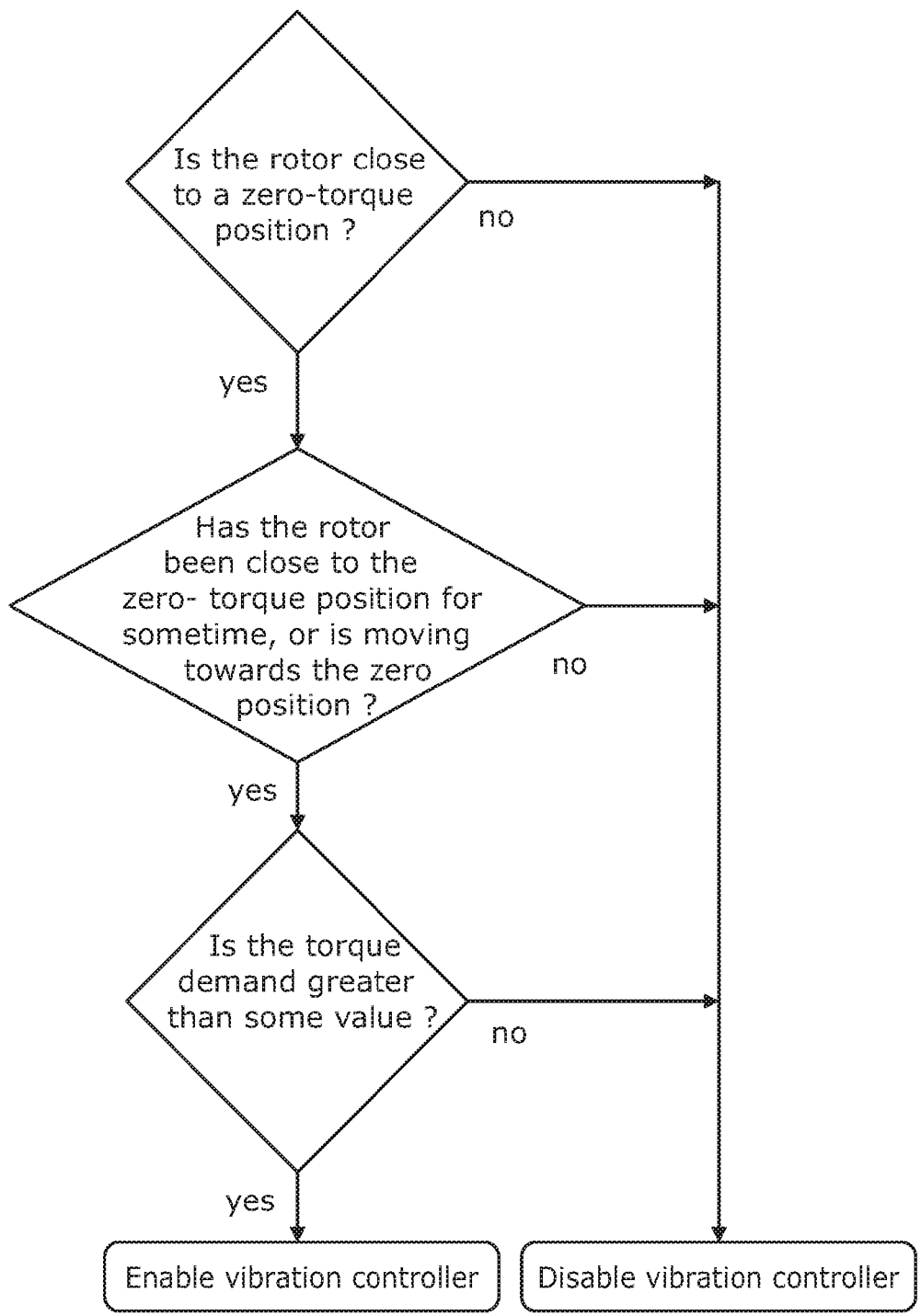
FIG. 9 is a flowchart showing steps performed when identifying that the motor controller should operate in a third mode to reduce the risk of the motor sticking at a zero torque point.

FIG. 9 is a flowchart showing the logical steps that can be performed by the motor circuit for deciding that the motor may become stuck, and as such for deciding on the time of entry and exit of the third mode. The order in which these steps can be performed may of course be varied. As shown, the motor circuit first checks the position of the motor rotor relative to the known zero point or points. The rotor is close to a zero point if it is within a zone defined as a range of angles either side of zero. This range may be dependent on the torque demanded too. If it is in the range, the circuit checks to see how long it has been there. Next the circuit checks if the motor is moving towards the zero point. The torque demanded is also checked, to see if it is above or below a threshold. If it is above, there is an increased risk that a driver may not be able to push the steering past the zero point.

If all the checks show that the rotor is at risk of settling at the zero point (near to zero point, moving slowly towards it, in range for a long time), the circuit identifies that there is risk of an event in which the motor and steering may become stuck because the driver is unable to push through the zero point. In this event, the system carries out the following steps.

Initially, on entering the third mode, the demanded torque from the controller is no longer passed to the motor. In particular, where the motor control comprises a feedback strategy of the kind shown in FIG. 4 modified as shown in FIG. 5, the demand is not fed into the feedback loop. Instead, it is replaced with a modified torque demand from the discrete control block. The modified torque demand is set to a value that causes the motor to move back away from the zero point. This is always possible because the system is in tension due to the combination of the driver's turning of the handwheel and the motor's assistance torque together forcing the steering system in the same direction. When the torque demand is reduced or even reversed (opposite sign) the system will relax and the motor will move back. In particular, it can move back by a given amount due to compliance in the gearbox without any corresponding movement of the steering wheel being required.

After sufficient time has elapsed for the motor to move back away from the zero position by a defined angular distance the torque demand is returned to a value that will cause the motor to move back towards the zero position again. This is maintained for a period of time, whilst the motor rotor position and speed is checked to see if the event has cleared and the rotor has moved past the zero point, or if the motor is again likely to be stuck.

If the rotor has not cleared the zero point, the event is identified again and the reverse and forward sequence is repeated.

In many cases, because the motor has been backed off and the system has unloaded, the motor can move rapidly forward towards the zero point after it has been reversed out, and momentum will help carry it past the zero position. By careful selection of the modified torque demand, time that it is applied for, position it moves back to etc., the system can be tuned to increase the chances of the rotor moving through the zero position.

Once past the zero-torque position, the final act of the vibration controller is to increase the current demand and propel the motor away from the zero-torque position, thus compensating for any loss of momentum that the "step-back" may have engendered.

Figure 7:
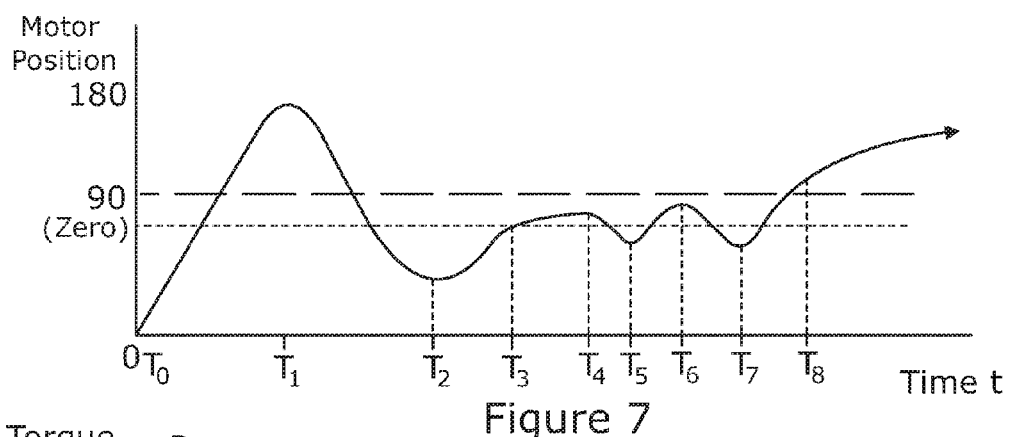
FIG. 7 is a plot of motor position against time during a representative use of the steering system of FIG. 1.
Figure 8:
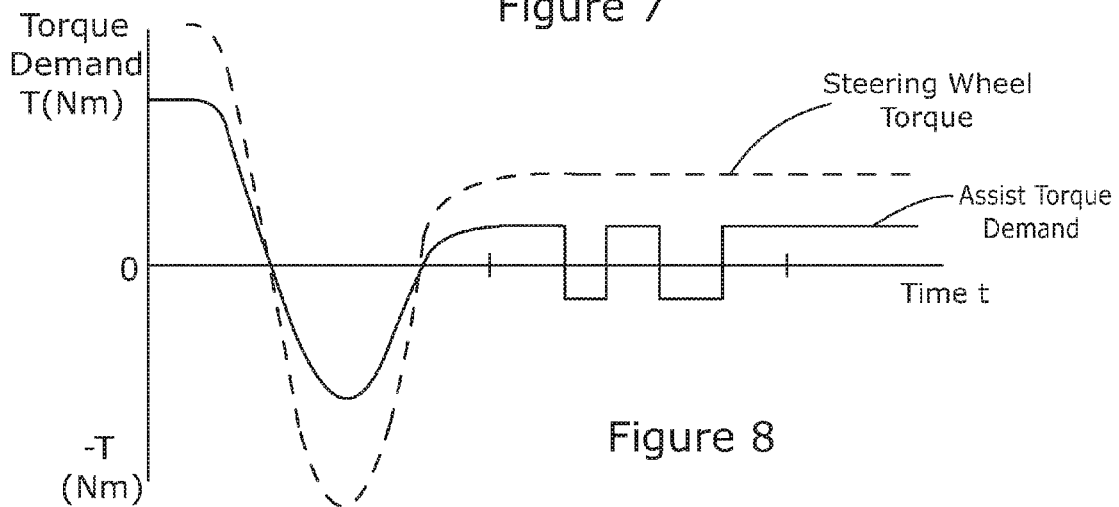
FIG. 8 is a plot of torque demand and steering wheel torque against time that corresponds to the period of time shown in FIG. 7.

FIGS. 7 and 8 show the operation of the motor circuit. In FIG. 7 a plot of motor rotor position against time is shown. In FIG. 8 a corresponding plot of steering torque (the solid line) and demanded torque (the dashed line) is shown.

Initially, between time T0 and T1, the driver turns the wheel in one direction by applying a positive torque. The motor applies a matching but reduced value assistance torque. This makes it easier to turn the wheel. At time T1 to T2 the driver turns the wheel the other way, and again a matching torque demand is provided. Note that the demanded torque does not always match the actual assistance torque achieved. In the normal mode it will generally match, but in the first mode where an open circuit has occurred it will vary with motor position.

Now assume the motor has an open fault. From time T3 to T4 the driver is moving the wheel slowly and the motor will approach a zero point. In this example assume the zero occurs at time T4, at which time the rotor will be located at 90 degrees to the failed phase which is the location of the zero torque point. Once the motor rotor gets close to this point, within say 8 degrees, a possible fault event is identified and the motor will be reversed away for a short time (up to time T5) by changing the torque demanded. After a time has elapsed, it will then be moved forward again towards the zero point (time T5 to T6) by changing the torque demand signal to an appropriate value. In this example, this is not enough to push past the zero point, so the reverse is applied again between time T6 and T7 followed by another forward movement. This time it can be seen that the system has enough momentum to push past the zero torque position.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of operating an electric motor of an electric power assisted steering system of the kind which includes a multi-phase motor that is operatively connected to a part of the steering system that rotates with the steering wheel so as to apply an assistance torque that during normal operation assists a driver in turning the steering wheel, the assistance torque generated by the motor being controlled by a motor torque demand circuit that outputs a motor torque demand signal to a motor controller, the motor having a defined fault mode in which the motor is incapable of generating an output torque when a motor rotor is located in at least one angular position regardless of the motor torque demand output by the motor controller, the method comprising performing the following steps when the motor is known to be in the defined fault mode:

A) monitoring the position of the motor rotor,
B) identifying the presence of a condition in which the rotor is within a predefined angular range of the at least one known angular position, the rotor is moving towards that position due to the driver turning the steering wheel, and a torque is demanded from the motor which would tend to move the rotor closer to that angular position as the wheel continues to move in the identified direction of movement;
C) in the event that the condition is identified varying the currents applied to the motor to cause the motor rotor to move away from the known angular position; and
D) subsequently varying the torque demanded from the motor to cause the motor rotor to move back in a direction towards the known angular position.

2. The method of claim 1 in which the step C) comprises causing the motor to move back by a distance equal to, or less than, the angular movement of the rotor that can be accommodated by a compliance in a gearbox which would not cause a corresponding movement of the steering wheel.

3. The method of claim 2 in which the monitoring comprises repeating steps A) and B) after step C).

4. The method of claim 2 in which the step of varying the currents comprises reducing the torque demanded to zero when applying step C) and allowing the rotor to move away from the zero position solely under the returning force of the gearbox compliance.

5. The method of claim 1 which further comprises monitoring the rotor position after steps C) and D), and in the event the motor has not passed the zero position repeating steps C) and D).

6. The method of claim 1 which comprises in step C) varying the currents by applying a reduced motor torque demand signal value that is of the opposite sign and optionally of different magnitude to the original torque demand.

7. The method according to claim 1 in which the magnitude of the torque demanded from the motor in step C) is chosen to vary in proportion to the distance between the rotor position and a zero torque position, increasing as the distance increases.

8. The method according to claim 7 which further comprises, upon identifying that the motor has moved past the zero following the identified zero torque event, reducing the demanded torque below that which was demanded on entry to the event until the motor has moved past the zero position by a predetermined amount or until a predefined time has elapsed.

9. The method according to claim 7 which comprises a step of increasing the motor torque demand after the motor has moved past the zero position so as to allow the motor rotor to catch up with the steering wheel movement.

10. A motor circuit for use in an electric power assisted steering system of the kind in which a measurement of torque carried by a part of the steering system is used by the motor circuit to produce a torque demand signal indicative of a torque to be applied to the steering system by the motor, the motor circuit comprising:

a switching circuit comprising a plurality of electrical switches, a motor controller that receives a motor torque demand signal and produces control signals for a motor drive circuit that in turn drives the switches of the switching circuit;

whereby under certain fault mode conditions of the motor the motor is incapable of generating an output torque when a motor rotor is located in at least one known angular position, in which the motor circuit is operable under a defined set of motor conditions to reduce the risk of the motor becoming stuck in the at least one known angular position, the circuit including:

means for identifying the presence of a condition in which the rotor is within a predefined angular range of the at least one known angular position, the rotor is moving towards that position due to a driver turning the steering wheel, and a torque is demanded from the motor which would tend to move the rotor closer to that angular position as the wheel continues to move in the identified direction of movement; and torque demand varying means arranged in use to vary the torque demanded from the motor to cause the motor rotor to move away from the known angular position, and further arranged in use to subsequently vary the torque demanded from the motor to cause the motor rotor to move back in a direction towards the known angular position.

11. The motor circuit of claim 10 in which includes a three phase electric motor.

12. A electric power assisted steering system comprising a steering mechanism that connects a steering wheel to a road wheel, a torque sensor that produces a torque signal indicative of the torque carried by a part of the steering mechanism, and an electric motor circuit according to claim 10 that includes a motor that is connected to the steering mechanism so that torque produced by the motor is transferred to the steering mechanism, and a means for generating a torque demand signal indicative of a torque to be applied to the steering system by the motor that is a function of the torque measured by the torque sensor.

* * * * *